Aug. 19, 1924.

J. F. TAYLOR 1,505,230

WINDLASS ATTACHMENT FOR AUTOMOBILE WHEELS

Filed Aug. 6, 1923

WITNESSES

INVENTOR
J. F. TAYLOR,
BY
ATTORNEYS

Patented Aug. 19, 1924.

1,505,230

UNITED STATES PATENT OFFICE.

JOHN FRANK TAYLOR, OF CHARLESTON, SOUTH CAROLINA.

WINDLASS ATTACHMENT FOR AUTOMOBILE WHEELS.

Application filed August 6, 1923. Serial No. 656,031.

*To all whom it may concern:*

Be it known that I, JOHN FRANK TAYLOR, a citizen of the United States, and resident of Charleston, in the county of Charleston and State of South Carolina, have invented certain new and useful Improvements in Windlass Attachments for Automobile Wheels, of which the following is a specification.

My invention relates to improvements in windlass attachments for automobile wheels, and it consists in the combinations, constructions and arrangements herein described and claimed.

An object of the invention is to provide an attachment of simplified construction which is adapted to be mounted on the hub portion of the driving wheel of an automobile and which then affords means effective to make use of the power of the automobile to extricate the latter from mud or other obstruction from which it would otherwise be unable to move through inability to obtain traction because of slippage of the wheels.

A further object of the invention is to provide an attachment of the character described which comprises a plurality of wheel hub engaging elements adapted to be used selectively to adapt the attachment for application to automobile wheels having hub constructions of different dimensions and types.

A still further object of the invention is to provide an attachment of the character described which can be manufactured at a relatively low cost, is adapted to be readily applied to or removed from an automobile wheel hub and which is thoroughly practical commercially.

Other objects and advantages will be apparent from the following description, considered in conjunction with the accompanying drawings, in which—

Figure 1:
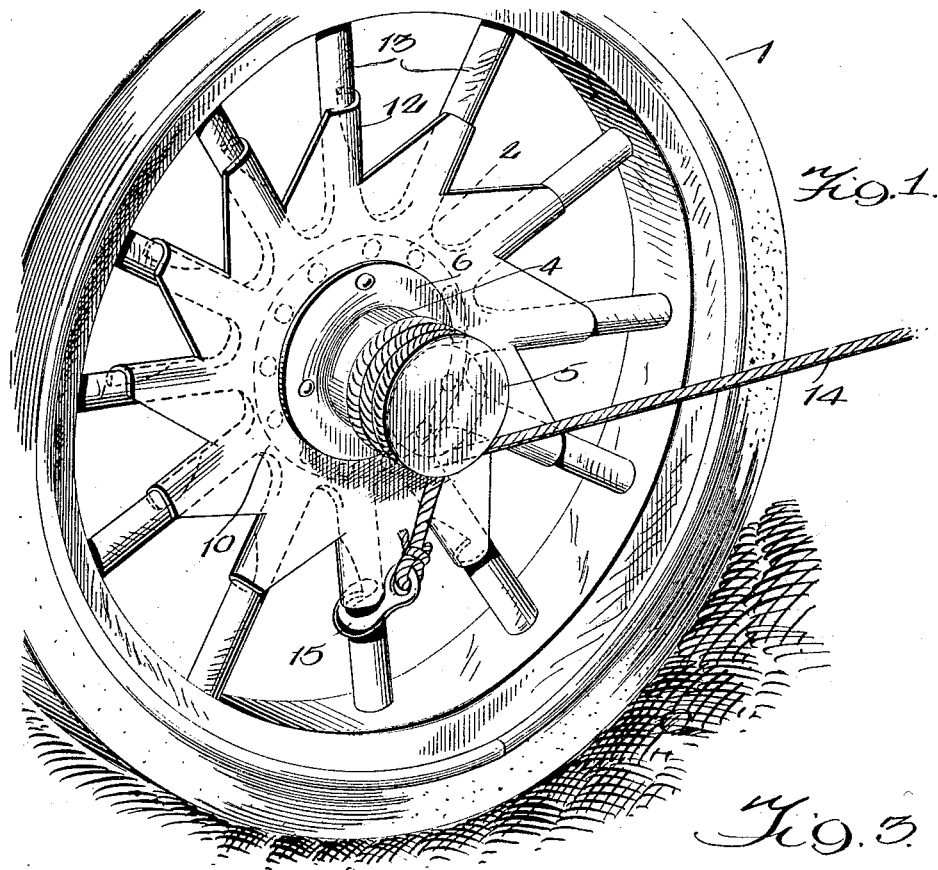
Figures 2, 3:
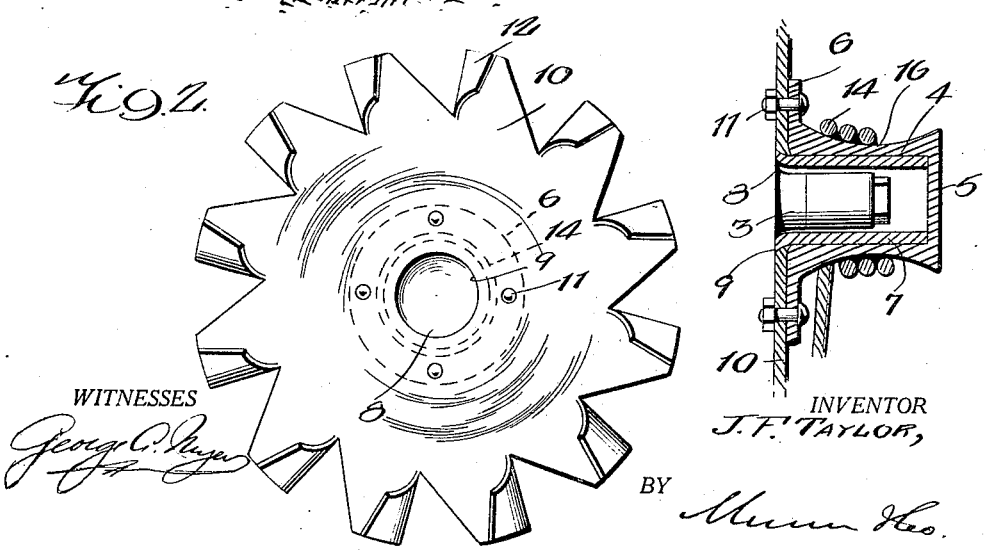

Figure 1 is a perspective view showing a vehicle wheel having a practical embodiment of the invention operatively applied thereto, Figure 2 is an end view of the attachment, Figure 3 is a fragmentary transverse section through the attachment, showing the cap carrying portion of a wheel hub received therein.

Referring now to the drawings, 1 designates a driving wheel of an automobile. The wheel 1 is shown as having a hub 2 provided with a reduced end portion 3 which extends in concentric relation to the wheel outwardly from the general plane of the wheel. The parts described so far are ordinary in construction and may vary considerably in details from the illustration in the drawings.

As is well known, automobiles frequently are stalled in mud or like impediment and are unable to move out of the mud or obstruction because of the fact that the wheels of the automobile turn in the mud without obtaining traction. I am aware that devices have been provided prior to my invention for attachment to the driving wheels of automobiles whereby the automobile may be pulled from mud or like obstruction by its own power. However, each of such prior devices has been adapted only for application to a driving wheel of a particular construction and so far as I am aware has not been adapted to be used with automobile driving wheels having hubs of different sizes and types of construction.

It is within the purview of my invention to provide a plurality of similar hub engaging members which may be used selectively as part of the attachment to adapt the attachment as a whole for application to wheels having hubs of different sizes and different types of construction within a wide range.

In carrying out my invention, I provide a drum 4 which is open at one end and which may be closed at its other end, as indicated at 5, the drum being provided at its open end with an outwardly extending annular flange 6. A bushing 7 is adapted to closely interfit the drum 4 when inserted in the open end of the latter into abutting relation with the closed end of the drum and to project beyond the open end of the drum as indicated at 8. The projecting or extending end portion 8 of the bushing 7 is shown as being slightly flared at its extremity to snugly interfit a central opening 9 in a plate 10 of light gauge material, the plate 10 being releasably secured to the drum through the agency of fastening devices 11 which engage with registering openings in the flange 6 and the plate 10.

The diameter of the bore of the sleeve 7 is such as to adapt the latter to snugly overfit the extending end portion 3 of a wheel hub of a particular size. While I have shown only one size and type of wheel hub and only one of the bushings 7, it is to be understood that I provide a plurality of bushings 7 having equal outer diameters and having the bores of the respective bushings fashioned as required to fit extending portions of wheel hubs of different dimensions and types of construction.

The plate 10 is substantially circular in configuration and is made of a single sheet of material formed to provide a plurality of spaced laterally struck portions 12 at its outer edge. The portions 12 are adapted to engage with the spokes 13 of the wheel and are curved arcuately from their outer lateral edges to their lines of juncture with the body of the plate 10. The spoke engaging portions 12 are thus adapted to conform to the contour of the spokes 13 and to fit the latter to hold the plate 10 rigid with the wheel 1 when a torque is imparted to the plate 10, tending to rotate it in one direction while the spoke engaging portions 12 and consequently the plate 10 may be disengaged from the wheel by rotating the plate in the opposite direction.

A torque may be imparted to the plate 10 through the agency of the cable 14 which carries a hook 15 at one end thereof adapted to engage with one of the spokes 13, the cable 14 being wound several times about the outer periphery of the drum 4 to hold the portion of the cable extending between the drum and the hook 15 taut. The drum 4 is provided with a cable receiving groove 16 in its outer periphery to prevent the convolutions of the cable on the drum 4 from disengaging the latter when a pull is exerted on the cable.

From the foregoing description of the various parts of the device, the operation thereof will be readily understood. When the automotive vehicle having the drive wheel 1 is stalled in the mud or like obstruction, the cable 14 is arranged as clearly shown in Figure 1, that is with the hook 15 in engagement with one of the spokes 13 and several convolutions of the cable disposed on the drum 4. The free end portion of the cable 14 then is extended forwardly and secured to a fixed support, not shown, which may be a stake or the like. It will be manifest that when the wheel 1 is driven by power derived from the power plant of the automobile vehicle the cable 14 will be wound on the drum 4 and the driving wheel 1 and consequently the vehicle will be drawn forward until the driving wheel 1 has been extricated from the mud and is able to obtain traction when the driving wheel turns. The diameter of the bore of the drum 4 and the diameter of the central opening in the plate 10 are sufficiently large to permit the use of the drum 4 and the plate 10 with the driving wheel of any one of a great many automotive vehicles of known types of construction. The adaptation of the device to the driving wheel of a particular automotive vehicle is accomplished by providing the bushing 7 having an inner diameter adapted to receive the extending hub portion of the wheel of the particular automotive vehicle.

Obviously, my invention is susceptible of embodiment in forms other than that illustrated in the accompanying drawings and I therefore consider as my own all modifications and adaptations of the form of the device disclosed herein which fairly fall within the scope of the appended claim.

Having thus described the invention, what I claim is:—

In a windlass attachment for a driving wheel of an automobile; a hollow drum open at one end, said drum having an outwardly extending flange at its open end and being adapted to enclose the outwardly extending hub portion of the wheel, and a plate secured flatwise against the outer face of said flange and having an opening in register with the bore of the hollow drum, said opening in the plate being of sufficient size to permit the extending end portion of the hub to be projected therethrough, said plate being substantially circular in configuration and having spaced laterally struck portions at its outer edge curved to engage with spokes of the wheel.

JOHN FRANK TAYLOR.